United States Patent
Weston et al.

(10) Patent No.: US 11,654,922 B2
(45) Date of Patent: May 23, 2023

(54) DRIVER ATTENTION AND HAND PLACEMENT SYSTEMS AND METHODS

(71) Applicant: Ford Global Technologies, LLC, Dearborn, MI (US)

(72) Inventors: Keith Weston, Canton, MI (US); Michael Alan Mcnees, Flat Rock, MI (US); Andrew Denis Lewandowski, Sterling Heights, MI (US); Brendan Diamond, Grosse Pointe, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/397,737

(22) Filed: Aug. 9, 2021

(65) Prior Publication Data

US 2023/0041371 A1 Feb. 9, 2023

(51) Int. Cl.
*B60W 40/08* (2012.01)
*B60W 50/14* (2020.01)
(Continued)

(52) U.S. Cl.
CPC ............ *B60W 40/08* (2013.01); *B60W 50/14* (2013.01); *G06T 7/13* (2017.01); *G06V 20/597* (2022.01);
(Continued)

(58) Field of Classification Search
CPC .................. B60W 40/08; B60W 50/14; B60W 2540/225; B60W 2540/229;
(Continued)

(56) References Cited

U.S. PATENT DOCUMENTS 5,874,892 A * 2/1999 Antonellis ............. B60Q 5/003
340/576
9,597,960 B2 * 3/2017 Okuda ................... G08G 1/167
(Continued)

FOREIGN PATENT DOCUMENTS

CN 110341713 A 10/2019
EP 2371649 A1 10/2011
(Continued)

OTHER PUBLICATIONS

Guido Borghi et al, "Hands on the Wheel: a Dataset for Driver Hand Detection and Tracking", Department of Engineering "Enzo Ferrari" University of Modena & Reggio Emilia, Modena, Italy, 2018, IEEE, 7 pages.

*Primary Examiner* — Zhen Y Wu
(74) *Attorney, Agent, or Firm* — Frank Lollo; Eversheds Sutherland (US) LLP

(57) ABSTRACT

Driver attention and hand placement systems and methods are disclosed herein. An example method includes providing warning messages to a driver of a vehicle based on steering wheel input or hand-wheel contact by the driver. The warning messages are provided according to a first scheme when the steering wheel input is above a threshold value and according to a second scheme when the steering wheel input is below a threshold value and images obtained by a camera in the vehicle indicate that at least one hand of the driver is on the steering wheel.

20 Claims, 4 Drawing Sheets

(51) Int. Cl.
*G06T 7/13* (2017.01)
*G06V 20/59* (2022.01)
*G06V 40/20* (2022.01)
*G06V 40/10* (2022.01)

(52) U.S. Cl.
CPC ............ *G06V 40/107* (2022.01); *G06V 40/28* (2022.01); *B60W 2040/0818* (2013.01); *B60W 2050/146* (2013.01); *B60W 2510/202* (2013.01); *B60W 2540/223* (2020.02); *B60W 2540/225* (2020.02); *B60W 2540/229* (2020.02); *G06T 2207/30268* (2013.01)

(58) Field of Classification Search
CPC ... B60W 2540/223; B60W 2040/0818; B60W 2050/146; B60W 2510/202; G06T 7/13; G06T 2207/30268; G06V 40/28; G06V 20/597; G06V 40/107
USPC .......................................................... 340/576
See application file for complete search history.

(56) References Cited

U.S. PATENT DOCUMENTS

| | | |
|---|---|---|
| 10,345,806 B2 | 7/2019 | Dias |
| 2004/0141634 A1* | 7/2004 | Yamamoto ............. B60K 37/06 382/104 |
| 2008/0042856 A1* | 2/2008 | Power .................... G08B 21/06 340/575 |
| 2012/0242819 A1* | 9/2012 | Schamp ............... G06V 20/597 348/78 |
| 2013/0076499 A1* | 3/2013 | Okita ..................... B60K 37/06 340/438 |
| 2013/0076615 A1* | 3/2013 | Iao ...................... G01C 21/3664 345/156 |
| 2014/0009276 A1* | 1/2014 | Backhouse ........... B60W 50/14 340/436 |
| 2014/0293053 A1* | 10/2014 | Chuang ................ B60K 28/066 348/148 |
| 2015/0166073 A1* | 6/2015 | D'Amato ............ B60W 40/076 701/1 |
| 2016/0107597 A1* | 4/2016 | Won ..................... B60W 50/14 340/439 |
| 2016/0357186 A1* | 12/2016 | Dias ..................... G06V 40/107 |
| 2017/0021862 A1* | 1/2017 | Akatsuka ............. B60W 50/14 |
| 2017/0291544 A1* | 10/2017 | Ishihara .................. G06F 3/013 |
| 2018/0022385 A1* | 1/2018 | Fu .......................... B60W 30/12 701/41 |
| 2018/0253094 A1* | 9/2018 | Chang .................. G05D 1/0055 |
| 2018/0326992 A1* | 11/2018 | Aoi ....................... B60W 50/14 |
| 2018/0335626 A1* | 11/2018 | Ji ....................... B60W 60/0051 |
| 2020/0017141 A1* | 1/2020 | Moreillon ................ B62D 6/08 |
| 2020/0398868 A1* | 12/2020 | Horii ................. B60W 60/0053 |
| 2021/0053488 A1* | 2/2021 | Ochoa Nieva ........ B60W 50/14 |
| 2021/0078609 A1* | 3/2021 | Barth ................ B60W 60/0057 |
| 2021/0094419 A1* | 4/2021 | Kumon ................. B60W 10/20 |
| 2021/0101639 A1* | 4/2021 | Chiu ..................... B60Q 3/283 |
| 2021/0209922 A1* | 7/2021 | Yang ..................... G08B 21/06 |
| 2022/0001874 A1* | 1/2022 | Yoshida ................ B60W 40/08 |
| 2022/0076040 A1* | 3/2022 | Delahaye ........... B60W 40/105 |

FOREIGN PATENT DOCUMENTS

| | | |
|---|---|---|
| JP | 2013161324 A | 8/2013 |
| WO | 2020002972 A1 | 1/2020 |

* cited by examiner

DRIVER ATTENTION AND HAND PLACEMENT SYSTEMS AND METHODS

BACKGROUND

Some vehicles may be equipped with driver assistance and/or attention systems that may monitor steering wheel contact or input. The systems may warn a driver when they have failed to provide sufficient steering wheel contact or input for a period of time. In some instances, the sensors that detect steering wheel contact or input may have operating parameters that create false positives. These false positives may result in warning messages that are displayed to the driver inadvertently and/or too frequently, which may degrade the user experience with unnecessary and excessive pop-up messages or warnings.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
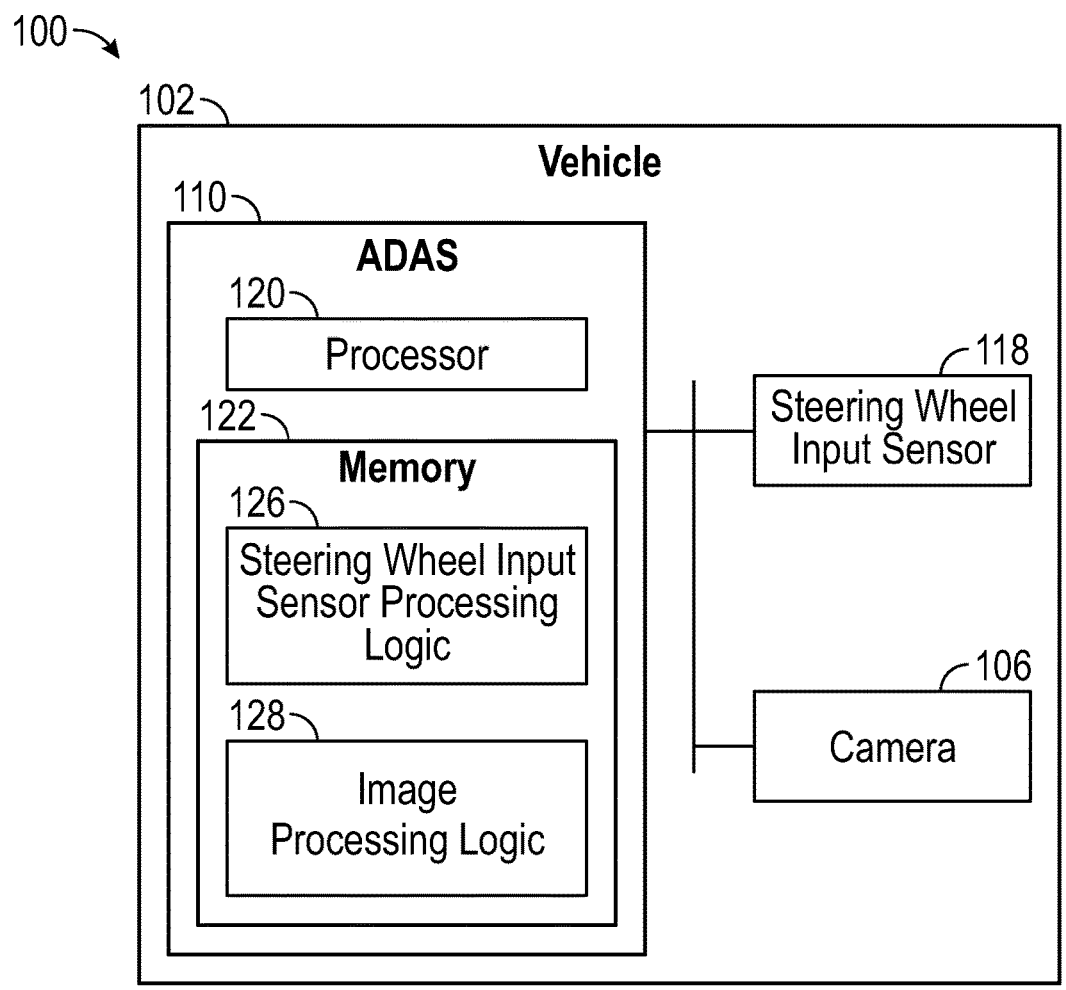
FIG. 1 illustrates an example architecture where the systems and method of the present disclosure may be practiced.
Figure 1:
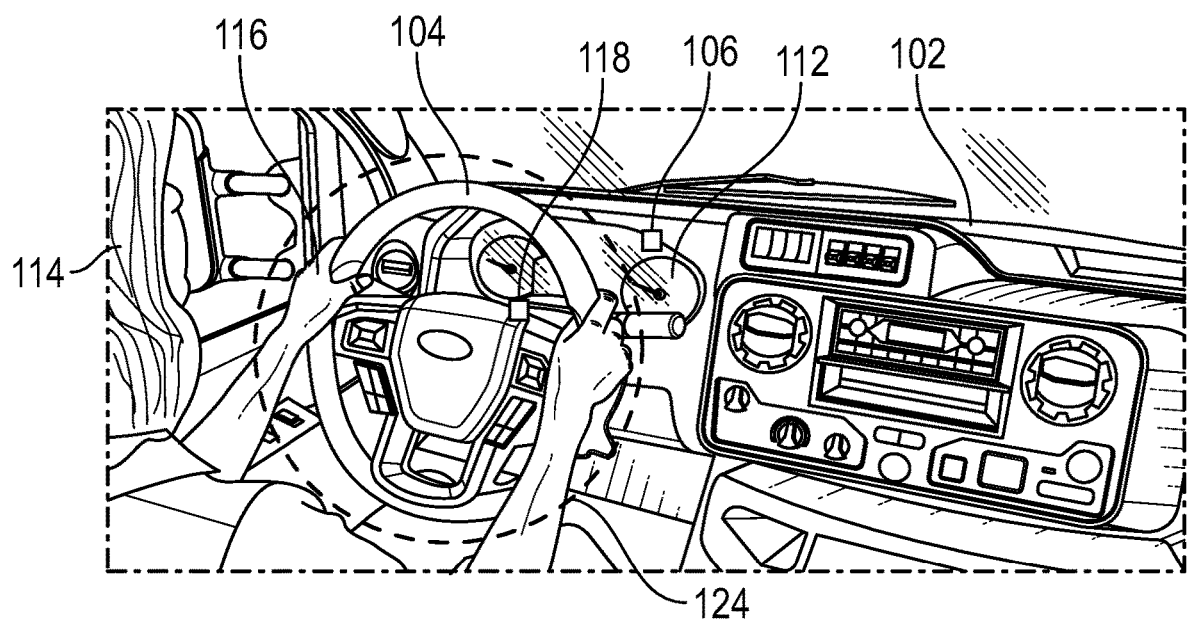

The present disclosure pertains to systems and methods that utilize image recognition and machine learning to monitor driver hand position on a steering wheel. These systems and methods can be used to reduce the number or periodicity (e.g., frequency) of warning messages presented to drivers. These warning messages may instruct the driver to place their hands on the steering wheel. While these types of warnings are valuable when provided appropriately, overprovision of these messages may be an annoyance to the driver.

The systems and methods may be used in conjunction with a vehicle system that ensures that the user's hands are on the steering wheel and/or in the correct position. An example method may involve the capturing of images from an onboard imaging device. Image processing techniques may be applied to isolate features and properties (steering wheel and hand positions). Features could include fingers, knuckles, wrists, as well as their orientations on a steering wheel when a hand is holding or otherwise in contact with the steering wheel.

A boundary-based algorithm may be applied to identify dissimilar pixels. A subset image may be processed using adaptive thresholding techniques to account for varying lighting conditions. Noise filtering and image sharpening may then be applied. An edge-detection algorithm may be re-applied to further remove unwanted and unnecessary image information. Noise filtering and image sharpening may then be re-applied. The image may then be compared against an array of known registered images for hand positions and angles on a control surface. A normalized correlation value matrix may then be computed. Resulting values will represent accuracy correlation for hand-to-wheel contact. The algorithm may then be re-tuned for thresholds on hand wheel torque to minimize false trips and warnings.

An example hand position monitoring system of the present disclosure may be combined with electronic horizon data and GPS positioning to determine how straight the road is and how constant the driver's heading has been the past several hundred meters. If the road is straight, the driver has been maintaining a constant heading, and the driver has hands on the wheel and is looking at the road ahead, then the frequency at which warnings are provided to the driver may be reduced. Additional logic can be implemented for adverse operating/weather conditions such that the vehicle can understand when the user is likely to be wearing gloves (cold weather/windy/etc.) or other hand coverings that could affect the image recognition accuracy/performance. If the user does not like that an interior camera is monitoring their hands, then they can switch to an alternative method (using hand-wheel torque to determine if the driver's hands are on the wheel). In some cases, the hand-torque methodology and the image recognition systems may be used in combination, with hand-torque being used when the hand-torque values are above a threshold, and with image recognition being used when the hand-torque values are below the threshold.

Illustrative Embodiments

Turning now to the drawings, FIG. 1 depicts an illustrative architecture 100 in which techniques and structures of the present disclosure may be implemented. The architecture 100 includes a vehicle 102. The vehicle 102 includes a steering wheel 104, a camera 106, an advanced driver assistance system (ADAS 110), and a human-machine interface (HMI 112).

A driver 114 may drive the vehicle 102 by placing one or more hands, such as a hand 116 on the steering wheel 104. The driver 114 provides input to the steering wheel 104 in the form of hand contact and/or pressure that can be determined by a steering wheel input sensor 118. The steering wheel input sensor 118 can include a torque sensor that determines when the driver is applying torque to the steering wheel 104. While a torque sensor has been contemplated, other steering wheel input sensors used to detect hand/steering wheel interactions can be used such as capacitive sensors, pressure sensors, and the like.

In general, the vehicle 102 may provide the driver with messages that inform the driver when steering wheel input is lacking. For example, a warning message can be presented to the user through the HMI 112 to place their hand(s) on the steering wheel when signals from the steering wheel input sensor 118 indicate that the driver is being inattentive (e.g., hands not on the steering wheel). These messages may be referred to as hand-on-wheel "HOOD" messages. The HMI 112 can include an infotainment system, a heads-up display projected onto a windshield, and/or a driver's instrument cluster positioned behind the steering wheel 104.

In general, when the hand-wheel torque value is above the established threshold value, no warning messages are triggered. When the hand-wheel torque value is below the established threshold value, warning messages can be triggered. It will be understood that the sensitivity or operating parameters of the steering wheel input sensor 118 may result in erroneous, inadvertent, and/or excessive numbers of warning messages being presented to the driver. Stated otherwise, a hand-wheel torque value may fall below a threshold measured in newton-per-meter (or other acceptable units) causing the ADAS 110 to trigger a warning.

However, some instances or driving conditions do not require the driver to exert hand-wheel torque to maintain vehicle control and ensure driver attentiveness, the hand-wheel torque value may fall below this threshold resulting in messages. By way of example, when hand-torque values are being used to determine if the user's hands are on the steering wheel and the driver operates the vehicle in a smooth manner without applying sufficient torque to the steering wheel, warning messages may be presented despite the driver being attentive and in control.

If the road the vehicle is traveling on is relatively straight, the driver may not need to apply torque to the steering wheel and warning messages may be presented in error. Hand-wheel torque may also be low when the driver allows the ADAS 110 to semi-autonomously control the vehicle. These are merely examples and not intended to be limiting.

In these instances or other similar instances, the ADAS 110 can be adapted to determine that the driver has at least one hand on the steering wheel despite the steering wheel input sensor 118 indicating that the driver's hand is not on the steering wheel. The additional process for determining that a hand of the driver is on the steering wheel can be used to confirm that the driver is in control of the vehicle and is being attentive.

In some instances, the ADAS 110 comprises a processor 120 and memory 122 for storing instructions. The processor 120 executes instructions stored in memory 122 to perform any of the methods disclosed herein. In general, the memory 122 can store steering wheel input sensor processing logic 126 and image processing logic 128. When referring to actions performed by ADAS 110 or vehicle 102, this implicitly involves the execution of instructions by the processor 120. Broadly, the ADAS 110 can be configured to use image recognition and machine learning to monitor driver hand position. In some instances, the ADAS 110 can be configured to use input from both the steering wheel input sensor 118 and images from the camera 106. The ADAS 110 can use signals from the steering wheel input sensor 118 as primary or initial input. However, when driver input to the steering wheel is lacking (e.g., hand-wheel torque is low), the ADAS 110 can process images to determine if at least one of the driver's hands is on the wheel. This type of image processing can be used as a secondary or additional method for ensuring driver attention and hand/wheel interaction.

The camera 106 can be adapted to obtain images of an area 124 around the steering wheel 104 of the vehicle 102. This can include obtaining images of not only the steering wheel, but also an area around the steering wheel 104 in order to identify when a hand of the driver is contacting or approximately in contact with the steering wheel 104. While one camera has been disclosed, the ADAS 110 can utilize images from various cameras positioned within the cabin of the vehicle 102. Each of these cameras can obtain images of the area around the steering wheel.

The ADAS 110 can be adapted to use images to identify hand position and incorporate feedback to minimize warning message intrusions when the driver has one or both hands on the wheel and is looking straight ahead. Thus, images can be processed by the ADAS 110 to ensure that the driver is both looking straightforward (e.g., eyes on the road) and that they have at least one hand on the wheel.

In general, the reduction in the amount or periodicity of warning messages is measured relative to how the ADAS 110 is configured to perform without image processing. For example, without image processing to determine hand/wheel interaction, the ADAS 110 may inadvertently present dozens of messages in a typical trip that is several hundreds of miles in length. When the ADAS is configured in accordance with the present disclosure, these messages can be reduced in half or less, depending on the actual attentiveness and/or hand/wheel interactions of the driver.

In some instances, the ADAS 110 is configured to perform image processing using various algorithms. For example, the image recognition process implemented by the ADAS 110 can involve using a hand-gesture formula:

$$M = \frac{\sum_{i,j}[(f_{ij} - f_m) \times (g_{ij} - g_m)]}{\left[\sqrt{\sum_{i,j}(f_{ij} - f_m)^2} \times \sqrt{\sum_{i,j}(g_{ij} - g_m)^2}\right]}$$

The hand-gesture formula can be used to establish a normalized correlation value matrix that may be used to determine a similarity degree between a known or registered hand image on a control surface input and one(s) currently being captured via the camera 106. It will be understood that $f_{ij}$ represents a brightness value of a pixel address for a registered/known hand image, $g_{ij}$ represents a brightness value of a pixel address for the captured image from the imaging device, $f_m$ represents average brightness values for a registered/known hand image, and $g_m$ represents average brightness values for the captured image from the imaging device.

The formula and logic used by the ADAS 110 may lessen the degree of error between what is determined to be a physical hand on a control surface and a falsely detected object on the control surface. In some instances, the ADAS 110 can process images to count and check for a number of fingers in close proximity to the steering wheel.

An array of image hand positions on the control surface at various locations can be generated and evaluate to determine one-handed and two-handed operation of the steering wheel 104. This would provide 360° hand positions around the control surface. The ADAS 110 can reasonably predict contact with control surfaces when correlation values are in the 0.85 to 0.90 range from the equation above. Additional filters may be utilized along with the correlation matrix established above to delete noises.

In some instances, the ADAS 110 can implement an image processing technique known as segmentation (edge coupled with a region) as a primary means to extract hand images from the images received from the imaging capture device.

Figure 2:
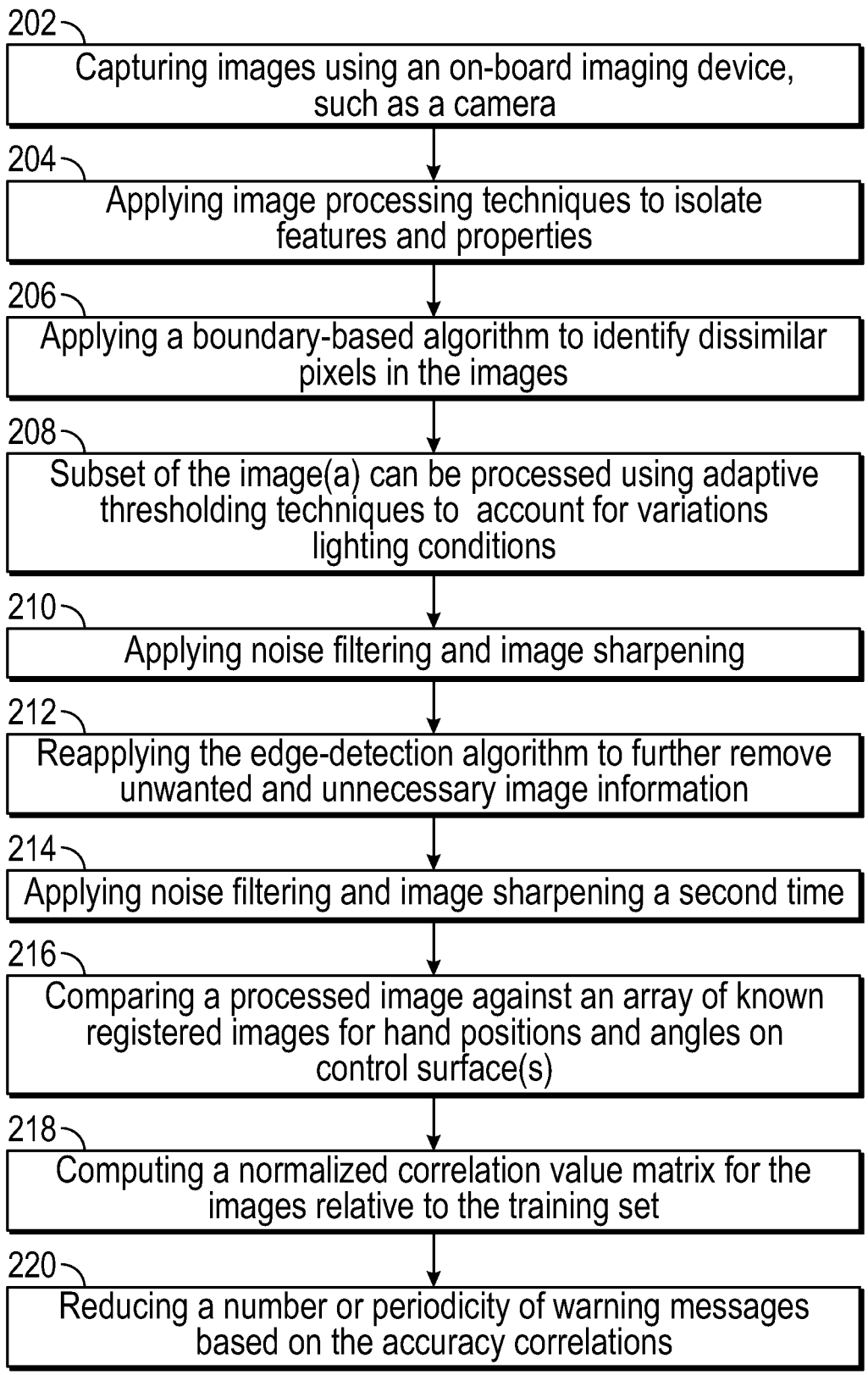
FIG. 2 is a flowchart of an example method for image processing that can be used in accordance with the present disclosure.

FIG. 2 illustrates an example method for image processing that can be utilized by the ADAS 110. Generally, the image processing logic an utilize segmentation techniques along with correlation checks and noise filtering to improve false indications.

The method includes a step 202 of capturing images using an on-board imaging device, such as a camera. The method can include a step 204 of applying image processing techniques to isolate features and properties. For example, the image processing techniques can be used to determine steering wheel and hand position(s).

The method can include a step 206 of applying a boundary-based algorithm to identify dissimilar pixels in the images. In one example, the boundary-based algorithm can include edge/region detection to differentiate between pixels that are indicative of a steering wheel and pixels that are indicative of a hand. In some instances, the pixels that are identified as either steering wheel or hand can be further processed. The remaining portions of the images can be ignored. Thus, in step 208, a subset of the image(a) can be processed using adaptive thresholding techniques to account for variations in lighting conditions.

The method can also include a step 210 of applying noise filtering and image sharpening. In some instances, the method can include a step 212 of reapplying the edge-detection algorithm to further remove unwanted and unnecessary image information. An optional step 214 includes applying noise filtering and image sharpening a second time.

Next, the method includes a step 216 of comparing a processed image against an array of known registered images for hand positions and angles on control surface(s). Thus, the processed image is compared to a training set of images that have been previously processed and categorized with respect to hand positions on control surfaces, such as steering wheels.

The method can also include a step 218 of computing a normalized correlation value matrix for the images relative to the training set. The normalized correlation value matrix indicates how closely the processed image compares to one or more images in the training set. It will be understood that the resulting values may represent accuracy correlation for hand-wheel contact. Using these computed values, the method can include a step 220 of reducing a number or periodicity of warning messages based on the accuracy correlations. That is, when the image processing indicates that the hand of the driver is likely on the steering wheel, warning message provision can be reduced or eliminated. In an alternate process, when the hand of the driver is likely on the steering wheel, the ADAS can selectively adjust thresholds related to hand-wheel torque to minimize false trips and warnings.

In addition to using image processing to identify driver control, these features can be combined with additional methods. For example, hand position monitoring by the ADAS 110 can be combined with electronic horizon data and GPS position data to determine when a road is straight and how constant the driver's heading has been over a period of time or distance. For example, the ADAS 110 can determine how consistent the heading of the vehicle has been for the past several hundred meters. When the ADAS 110 determines that the road is straight using the electronic horizon data and the driver has been maintaining a constant heading based on GPS position data, the ADAS 110 can reduce or eliminate a number of warning messages. The road may be considered to be straight when the electronic horizon data indicates that a curve is not likely to be encountered by the vehicle 102 within a predetermined distance in front of the vehicle 102. By way of example, the ADAS 110 may process images obtained of the road in front of the vehicle to determine that the vehicle will not encounter a curve for several hundred meters. The electronic horizon data can be collected by cameras positioned outside the vehicle. Similar data can be gathered from a map used in a navigation system of the vehicle.

In some instances, this reduction or elimination occurs only after the ADAS 110 has first determined that the driver has their hands on the steering wheel. In yet other instances, the ADAS 110 can also allow reduction or elimination of warning messages after the ADAS 110 has determined that the driver is looking straight ahead (e.g., eyes on the road ahead). In some instances, the reduction or elimination of warning messages occurs when ADAS 110 has determined: (1) that the driver's hand(s) is/are on the steering wheel; (2) the driver is looking straight ahead; (3) that the road is straight or likely straight; and (4) that the vehicle has been on a constant heading for a period of time or distance. In some instances, the ADAS 110 can be configured to reduce warning messages based on any one or more of these determinations. The reduction of warning messages can increase based on how many of these determinations have been made. For example, warning messages can be reduced by a first amount when only one determination has been made, a second amount when two are made, and so forth.

The hand-gesture image recognition logic can be further adapted to compensate for adverse operating and/or weather conditions, allowing the ADAS 110 to determine when the driver is likely to be wearing gloves or other hand coverings that could affect the image recognition accuracy and/or performance. For example, the ADAS 110 can obtain weather information from an onboard weather data module, such as an onboard thermometer. Weather data can also be obtained from an online resource when the vehicle is a connected vehicle that can access a network using a wireless connection protocol. Weather information, such as low temperature or wind, may indicate that the driver's hands may be obscured with a cover, such as gloves. The ADAS 110 can utilize this information to adjust how the image recognition logic processes pixels. In general, the image recognition logic may not look for only flesh-colored pixels, but a wider range of colors, as well as identify general hand shapes. Broadly, the ADAS 110 can determine when the hand of the driver is obscured with the covering by predicting the covering based on contextual information. The contextual information can include weather data, but other factors can be used such as a work schedule. For example, if the driver is a delivery driver that works between 8 am to 5 pm, the driver may wear gloves for protective purposes. The ADAS 110 can be configured to compensate during these hours and assume that the driver is wearing gloves.

The ADAS 110 can be configured to allow a driver to selectively adjust how warnings are communicated and calibrated. For example, the driver may be allowed to turn off warning messages altogether. The driver may also change how frequently messages are presented, regardless of the actual driving conditions or steering wheel/hand interactions measured. When these types of warning systems are mandatory but the user does not like that an interior camera is monitoring their hands, then they can switch to the default (existing) and potentially annoying method of hand detection.

Figure 3:
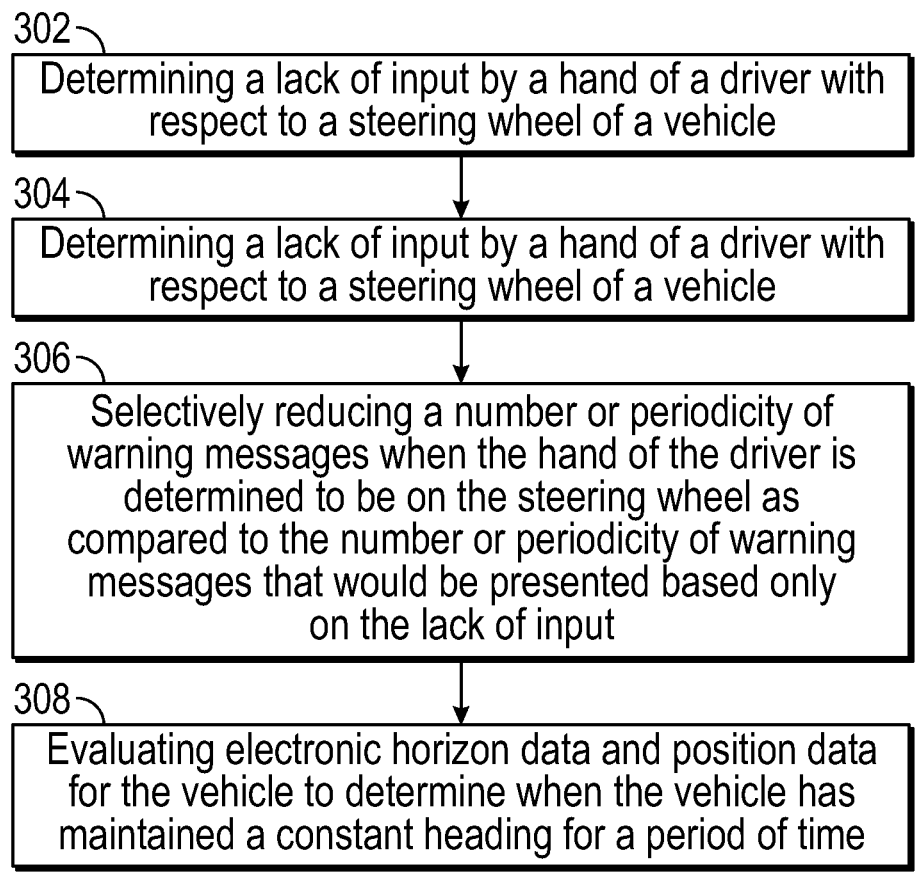
FIG. 3 is a flowchart of an example method for ensuring driver attention and hand placement analysis for reducing warning messages presented to a driver.

FIG. 3 is an example method of the present disclosure. The method can include a step 302 of determining a lack of input by a hand of a driver with respect to a steering wheel of a vehicle. This can include using any method or mechanism that determines when a driver's hand is not in physical contact with the steering wheel such as torque sensors or capacitive touch. In some instances, determining the lack of input includes determining a hand-torque value relative to being below a hand-torque threshold.

As noted above, normally, warning messages may be presented to the driver when the lack of input occurs for a period of time or over a particular distance. However, in order to reduce false positives and excessive warnings, the method can include a step 304 of determining a hand position of a hand of a driver relative to a steering wheel of a vehicle using images obtained for an area around the steering wheel. As noted above, the hand position indicates whether the hand of the driver is or is not contacting the steering wheel. Thus, the driver's hand can be determined to be in contact with, or near the steering wheel, despite the lack of input being sensed by the primary hand/steering wheel sensor(s).

When the hand is determined to be present based on image processing, the method can include a step 306 of selectively reducing a number or periodicity of warning messages when the hand of the driver is determined to be on the steering wheel as compared to the number or periodicity of warning messages that would be presented based only on the lack of input. Thus, there are a number or periodicity (e.g., frequency) of messages that would be presented based solely on the lack of input as determined in step 302. The method reduces the number or periodicity (e.g., frequency) of messages when the driver's hand is detected in step 304.

The method can also include as step 308 of evaluating electronic horizon data and position data for the vehicle to determine when the vehicle has maintained a constant heading for a period of time. This determination can be used in combination with the determination made in step 304 to reduce the presentation of warning messages.

Figure 4:
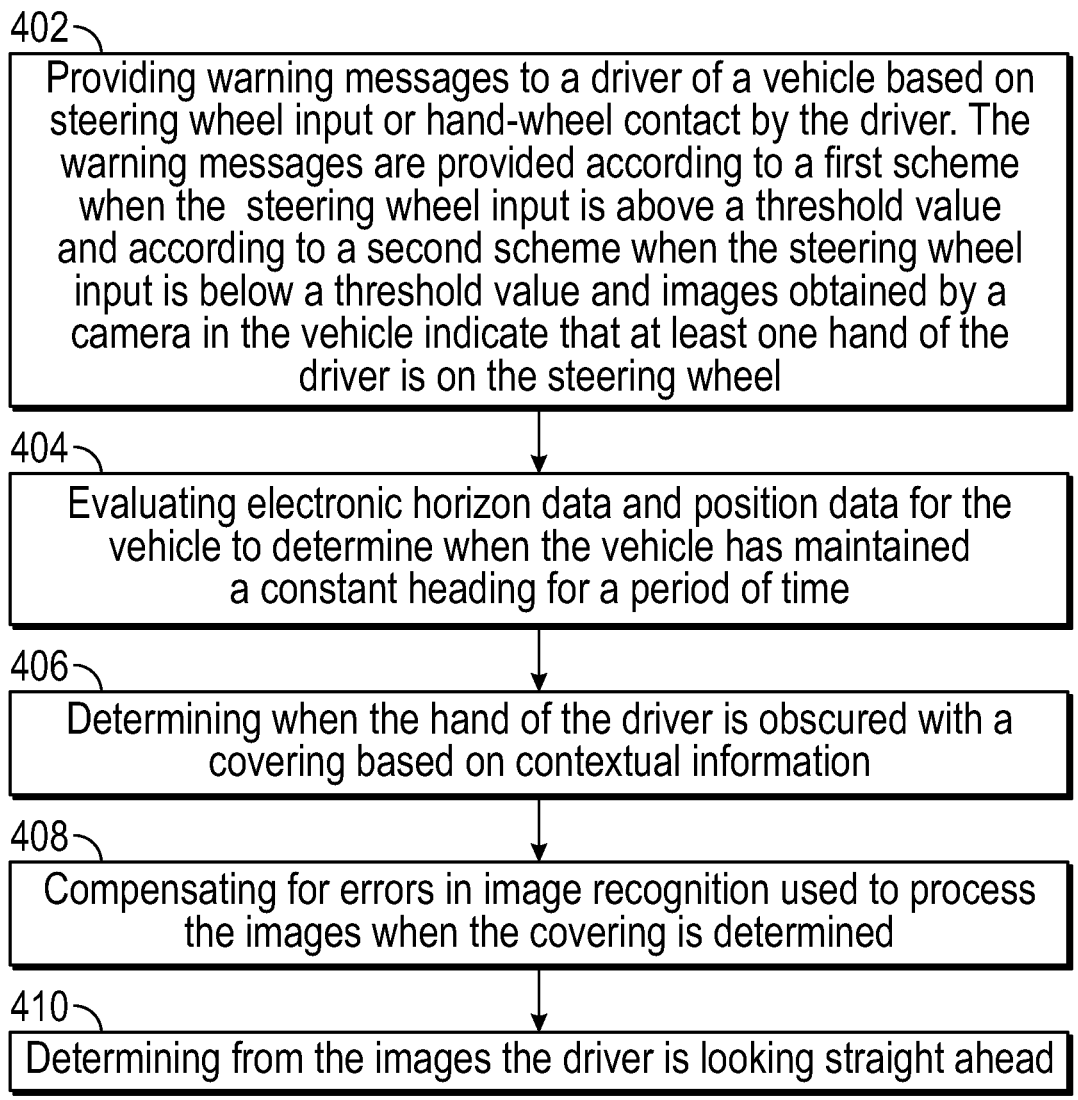
FIG. 4 is a flowchart of another example method for ensuring driver attention and hand placement analysis for reducing warning messages presented to a driver.

FIG. 4 is a flowchart of an example method of the present disclosure. The method includes a step 4ludes a step 402 of providing warning messages to a driver of a vehicle based on steering wheel input or hand-wheel contact by the driver. The warning messages are provided according to a first scheme when the steering wheel input is above a threshold value and according to a second scheme when the steering wheel input is below a threshold value and images obtained by a camera in the vehicle indicate that at least one hand of the driver is on the steering wheel. The first scheme can include providing warning messages at a first frequency. The second scheme can include providing warning messages at a second frequency, where the second frequency is less than the first frequency.

Next, the method can include a step 404 of evaluating electronic horizon data and position data for the vehicle to determine when the vehicle has maintained a constant heading for a period of time. The second scheme is used when the vehicle has maintained the constant heading for the period of time.

As noted above, various compensating processes can be used based on driving context. Thus, the method can include a step 406 of determining when the hand of the driver is obscured with a covering based on contextual information, as well as a step 408 of compensating for errors in image recognition used to process the images when the covering is determined. In some instances, the method can include a step 410 of determining from the images the driver is looking straight ahead. Any one or more of steps 406-410 can be used to enhance or tune the image processing logic.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining a lack of input by a hand of a driver with respect to a steering wheel of a vehicle;
   determining a hand position of the hand of the driver relative to the steering wheel of the vehicle using images obtained for an area around the steering wheel, the hand position indicating whether the hand of the driver is or is not contacting the steering wheel; and
   selectively reducing a number or periodicity of warning messages when the hand of the driver is determined to be on the steering wheel as compared to the number or periodicity of warning messages that would be presented based only on the lack of input.

2. The method according to claim 1, wherein determining the lack of input comprises determining a hand-torque value being below a hand-torque threshold.

3. The method according to claim 1, further comprising evaluating electronic horizon data and position data for the vehicle to determine when the vehicle has maintained a constant heading for a period of time.

4. The method according to claim 1, further comprising:
   determining when the hand of the driver is obscured with a covering; and
   compensating for errors in image recognition used to process the images when the covering is determined.

5. The method according to claim 4, wherein determining when the hand of the driver is obscured with the covering comprises predicting the covering based on contextual information.

6. A method, comprising:
determining warning messages to a driver of a vehicle based on a steering wheel input or hand-wheel contact by the driver on a steering wheel,
wherein the warning messages are presented at (i) a first frequency when the steering wheel input is above a threshold value and (ii) a second frequency when the steering wheel input is below the threshold value and images obtained by a camera in the vehicle indicate that a hand of the driver is on the steering wheel, wherein the second frequency is less than the first frequency.

7. The method according to claim 6, wherein the steering wheel input comprises a hand-torque value.

8. The method according to claim 6, further comprising evaluating electronic horizon data and position data for the vehicle to determine when the vehicle has maintained a constant heading for a period of time, wherein the second frequency is used when the vehicle has maintained the constant heading for the period of time.

9. The method according to claim 6, further comprising:
determining when the hand of the driver is obscured with a covering based on contextual information; and
compensating for errors in image recognition used to process the images when the covering is determined.

10. The method according to claim 6, further comprising determining from the images the driver is looking straight ahead.

11. The method according to claim 10, further comprising isolating features and properties of the steering wheel and the hand from the images, along with relative positions of the steering wheel and the hand.

12. The method according to claim 11, further comprising:
determining dissimilar pixels in the images using edge-detection; and
processing the dissimilar pixels using adaptive thresholding to account for various lighting conditions.

13. The method according to claim 12, further comprising reapplying the edge-detection to further remove unwanted and unnecessary image information.

14. The method according to claim 13, further comprising comparing the images to an array of known registered images for hand positions and angles on a control surface to determine when the hand is on the steering wheel.

15. A vehicle, comprising:
a steering wheel input sensor;
a camera;
an advanced driver assistance system comprising a processor and memory, the processor executing instructions to:
determine a lack of input by a hand of a driver with respect to a steering wheel of the vehicle based on signals received from the steering wheel input sensor, wherein a warning message is presented to the driver when the lack of input occurs for a period of time;
determine a hand position of the hand of the driver relative to the steering wheel of the vehicle using images obtained for an area around the steering wheel and from the camera, the hand position indicating whether the hand of the driver is or is not contacting the steering wheel; and
selectively reducing a number or periodicity of warning messages when the hand of the driver is determined to be on the steering wheel as compared to the number or periodicity of warning messages that would be presented based only on the lack of input.

16. The vehicle according to claim 15, wherein the processor is configured to alter the presentation of the warning message by selectively reducing a number or periodicity of the warning message.

17. The vehicle according to claim 15, wherein the processor is configured to evaluate electronic horizon data and position data for the vehicle to determine when the vehicle has maintained a constant heading for a period of time.

18. The vehicle according to claim 15, wherein the processor is configured to:
determining when the hand of the driver is obscured with a covering; and
compensating for errors in image recognition used to process the images when the covering is present.

19. The vehicle according to claim 18, wherein the processor is configured to predict the covering based on contextual information.

20. The vehicle according to claim 15, wherein the processor is configured to cause the camera to obtain images of an area around the steering wheel.

* * * * *